(12) United States Patent  
Boehner et al.

(10) Patent No.: US 8,210,588 B2
(45) Date of Patent: Jul. 3, 2012

(54) VEHICLE GRAB HANDLE

(75) Inventors: Jan Boehner, Ingolstadt (DE); Hubert Loewe, Weselberg (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 582 days.

(21) Appl. No.: 11/988,954

(22) PCT Filed: Jul. 14, 2006

(86) PCT No.: PCT/EP2006/006925
§ 371 (c)(1),
(2), (4) Date: Jul. 15, 2009

(87) PCT Pub. No.: WO2007/009677
PCT Pub. Date: Jan. 25, 2007

(65) Prior Publication Data
US 2009/0295180 A1    Dec. 3, 2009

(30) Foreign Application Priority Data

Jul. 18, 2005  (DE) .................... 20 2005 011 297 U (51) Int. Cl.
*B60N 3/02* (2006.01)
*A45C 13/22* (2006.01)
*A45C 13/26* (2006.01)

(52) U.S. Cl. ....... 296/1.02; 296/37.7; 296/71; 296/97.9; 296/214; 188/83; 16/418; 16/438; 16/445

(58) Field of Classification Search .................... 16/412, 16/444, 445, 438, 413, 422; 296/214, 210, 296/39.1, 71, 102
See application file for complete search history.

(56) References Cited

U.S. PATENT DOCUMENTS

| 5,975,606 | A  | * | 11/1999 | Forbes et al. ................ 296/1.02 |
| 6,467,130 | B2 | * | 10/2002 | Kurachi et al. ................ 16/438 |
| 2002/0020042 | A1 |  | 2/2002 | Kurachi et al. |
| 2002/0020250 | A1 | * | 2/2002 | Sakuma et al. ............. 74/551.9 |
| 2003/0074767 | A1 | * | 4/2003 | Chang ............................ 16/438 |
| 2005/0091798 | A1 |  | 5/2005 | Belchine, III et al. |

FOREIGN PATENT DOCUMENTS

| EP | 1 125 790 A2 | 8/2001 |
| EP | 1 498 307 A2 | 1/2005 |
| JP | 2001-163104 | 6/2001 |
| JP | 2005-138823 | 6/2005 |

* cited by examiner

*Primary Examiner* — Glenn Dayoan
*Assistant Examiner* — Sunsurraye Westbrook
(74) *Attorney, Agent, or Firm* — Tarolli, Sundheim, Covell & Tummino LLP (57) ABSTRACT

The invention relates to a vehicle grab handle (10) having a handle (12) and at least one bearing support (14) for attaching the vehicle grab handle (10) to a vehicle body, a bearing section (18) of the handle (12) being pivotally mounted to the bearing support (14), two shaft stubs (22, 24) being provided on the bearing support (14) which define a pivot axis (S) for the handle (12) and which can be shifted along the pivot axis (S) from an initial position to a connection position, and the shaft stubs (22, 24) coupling the handle (12) and the bearing support (14) to one another in the connection position.

9 Claims, 7 Drawing Sheets

VEHICLE GRAB HANDLE

FIELD OF THE INVENTION

The invention relates to a vehicle grab handle comprising a handle and at least one bearing support for attaching the vehicle grab handle to a vehicle body, a bearing section of the handle being pivotally mounted to the bearing support.

BACKGROUND OF THE INVENTION

Previously, the handle was pivotally attached to the bearing support by means of a bearing shaft. Openings were provided here in the handle and in the bearing support for the bearing shaft which were visible from the outside in fitted state, which had a negative visual impact. Moreover, it was made difficult to fit installation elements such as return springs or dampers.

In comparison to the latter, DE 203 10 944 U1 discloses an improved vehicle grab handle with which the bearing shaft is designed as one part with the bearing support and is rotatably cast into a bearing section of the handle. With a grab handle of this type, the individual components co-operate precisely with one another; there is absolutely no play between the handle and the bearing support This can lead to problems when fitting the vehicle grab handle on a vehicle body because the attachment device for the vehicle grab handle on the vehicle body side generally has certain tolerances.

SUMMARY OF THE INVENTION

The invention now provides a vehicle grab handle according to the preamble to Claim 1 in which two shaft stubs are provided on the bearing support which define a pivot axis of rotation for the handle and which can be shifted along this pivot axis of rotation from an initial position to a connection position, the shaft stubs coupling the handle and the bearing support to one another in the connection position. Thus, by means of the shaft stubs, a simple and reliable pivotal connection is provided between the handle and the bearing support.

In the initial position of the shaft stubs, the bearing support is movable between two bearing lugs of the handle. The bearing support and the handle can thus be moved relative to one another into a fitting position.

In one embodiment, in the initial position, the shaft stubs form a pre-fitted unit with the bearing support, and are secured against release on the bearing support. This makes fitting considerably easier and reduces the number of individual parts to be fitted on site.

Preferably, the bearing section of the handle has recesses in which the shaft stubs engage in the connection position. In this way, it is very easy to produce the pivotal connection.

Moreover, it is possible for the recesses to have a circumferential wall for guiding the shaft stubs and a base for limiting the axial displacement of the shaft stubs. In this case, due to production tolerances, the shaft stubs are guided with a certain amount of play and limited in their axial displacement by the base of the recesses in such a way that a movement of the shaft stubs from the initial position to beyond the connection position is not possible.

In a particularly preferred embodiment, the bearing support has an installation element located between the two shaft stubs which locks the shaft stubs in the connection position. After being fitted, the installation element thus prevents a movement of the shaft stubs back towards the initial position, and thus an undesired release of the pivotal connection between the handle and the bearing support.

In this case, the installation element can be a spring housing or a damper. In general, in today's vehicle grab handles, this type of installation element are in any event attached and according to the invention additionally take on a locking function for the shaft stubs. Moreover, the spring housing of a return spring or the damper is preferably attached such that the axis of the return spring or the damper is located close to the axis of rotation. This happens automatically according to the invention because the installation elements are located between the two shaft stubs and so on the axis of rotation.

In a further embodiment, two bearing supports, each comprising an installation element, are provided for attaching the vehicle grab handle, the installation elements having identical external dimensions. Thus, on the one hand the two bearing supports can be designed to be identical in construction, and on the other hand, the installation elements can be used arbitrarily in the bearing supports. This reduces the number of different components and simplifies fitting.

In a further embodiment, the bearing support and the shaft stubs can be produced as a two-component injection moulded unit. This reduces production costs because the bearing supports and the shaft stubs need not be produced separately and subsequently joined together.

BRIEF DESCRIPTION OF THE DRAWINGS

Additional features and advantages of the invention are given in the following description of a preferred embodiment and the attached drawings to which reference is made. In the drawings.

DESCRIPTION OF EXAMPLE EMBODIMENTS

Figure 1:
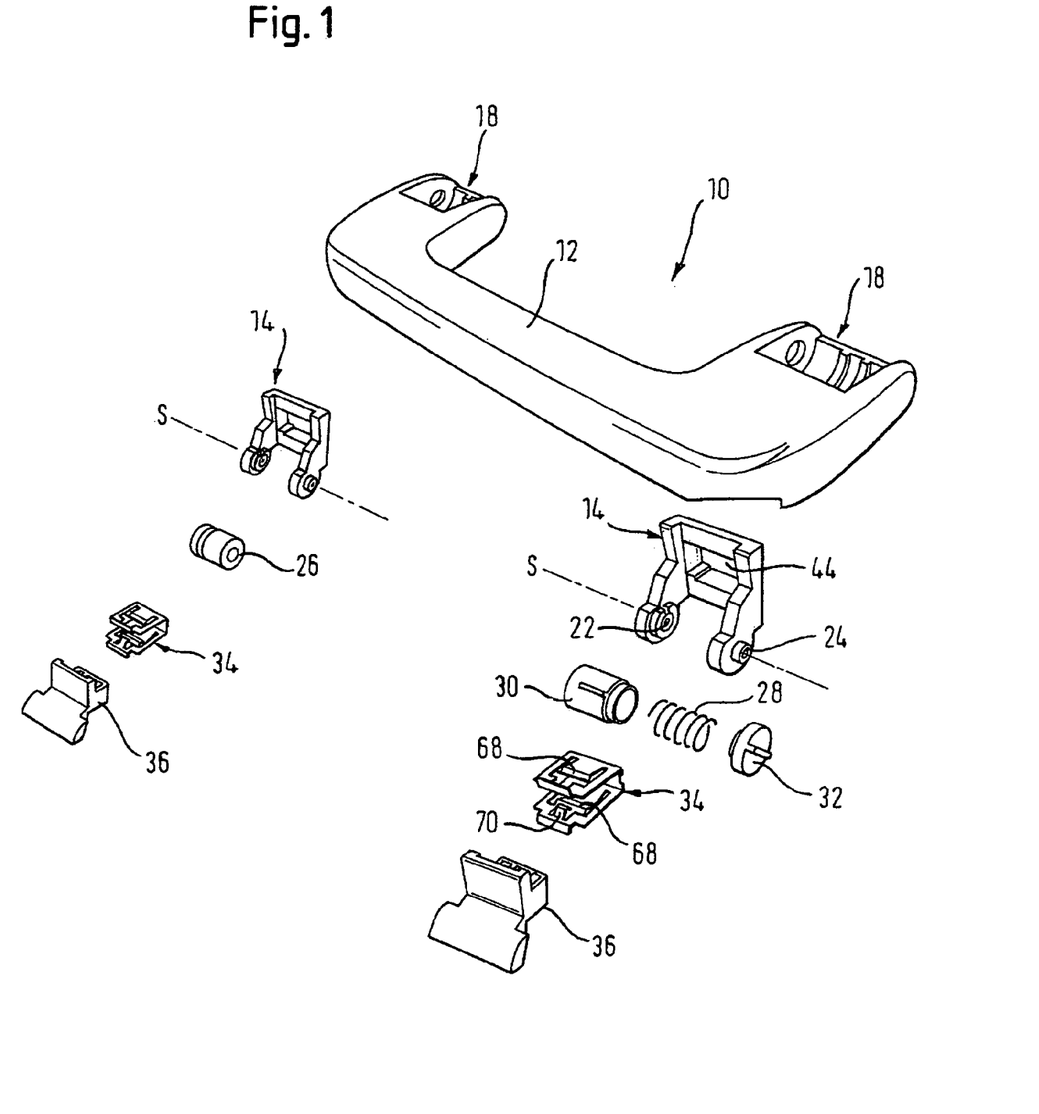
FIG. 1 shows an exploded view of the vehicle grab handle according to the invention.
Figure 7:
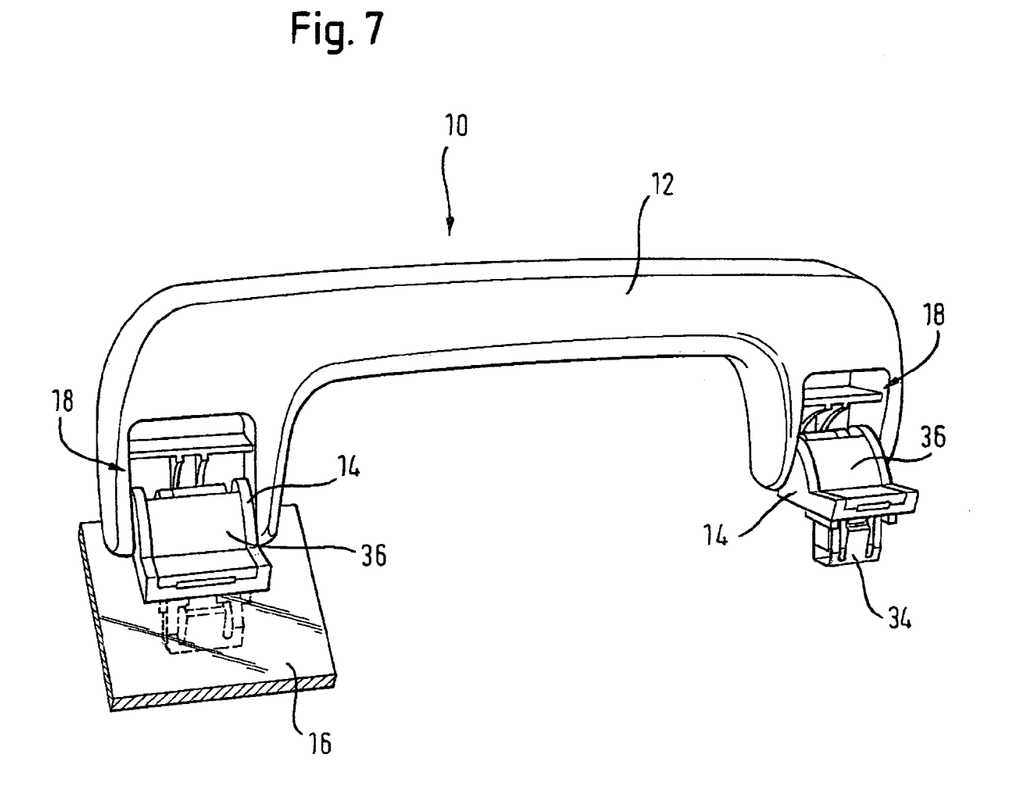
FIG. 7 shows a perspective view of the vehicle grab handle according to the invention in attached state.

FIG. 1 shows a vehicle grab handle 10 with a handle 12 and two bearing supports 14 for attaching the vehicle grab handle 10 to a vehicle body 16 (see FIG. 7). Exactly like the bearing supports 14, the handle 12 is made from a synthetic. In this case, it is made in one piece and has two bearing sections 18 by means of which the handle 12 is pivotally fitted to the bearing supports 14. In other embodiments, the handle is formed from several parts, for example with two separate bearing sections which are bonded, welded, clipped, screwed or pinned to a central part.

On the bearing support 14, two shaft stubs 22, 24 are provided which define a pivot axis S for the handle 12 and which can be shifted along this pivot axis S.

Furthermore, in FIG. 1 a damper 26 and a return spring 28 with a spring housing 30, 32 can be seen. In the fitted state, the return spring 28 is totally surrounded by the spring housing 30, 32. In the following, the spring housing 30, 32 and the damper 26 are called installation elements.

Moreover, two metal brackets 34 are shown with which the bearing supports 14 are attached to the vehicle body 16.

Furthermore, two securing elements 36 are provided which prevent the connection between the metal brackets 34 and the vehicle body 16 from being released.

Apart from the respective installation element, the components are totally identical so that in the following detailed views, only one bearing section 18 of the vehicle grab handle 10 is shown. Because the installation elements have identical external dimensions, the fitting process for both bearing supports 14 is the same.

Figure 2:
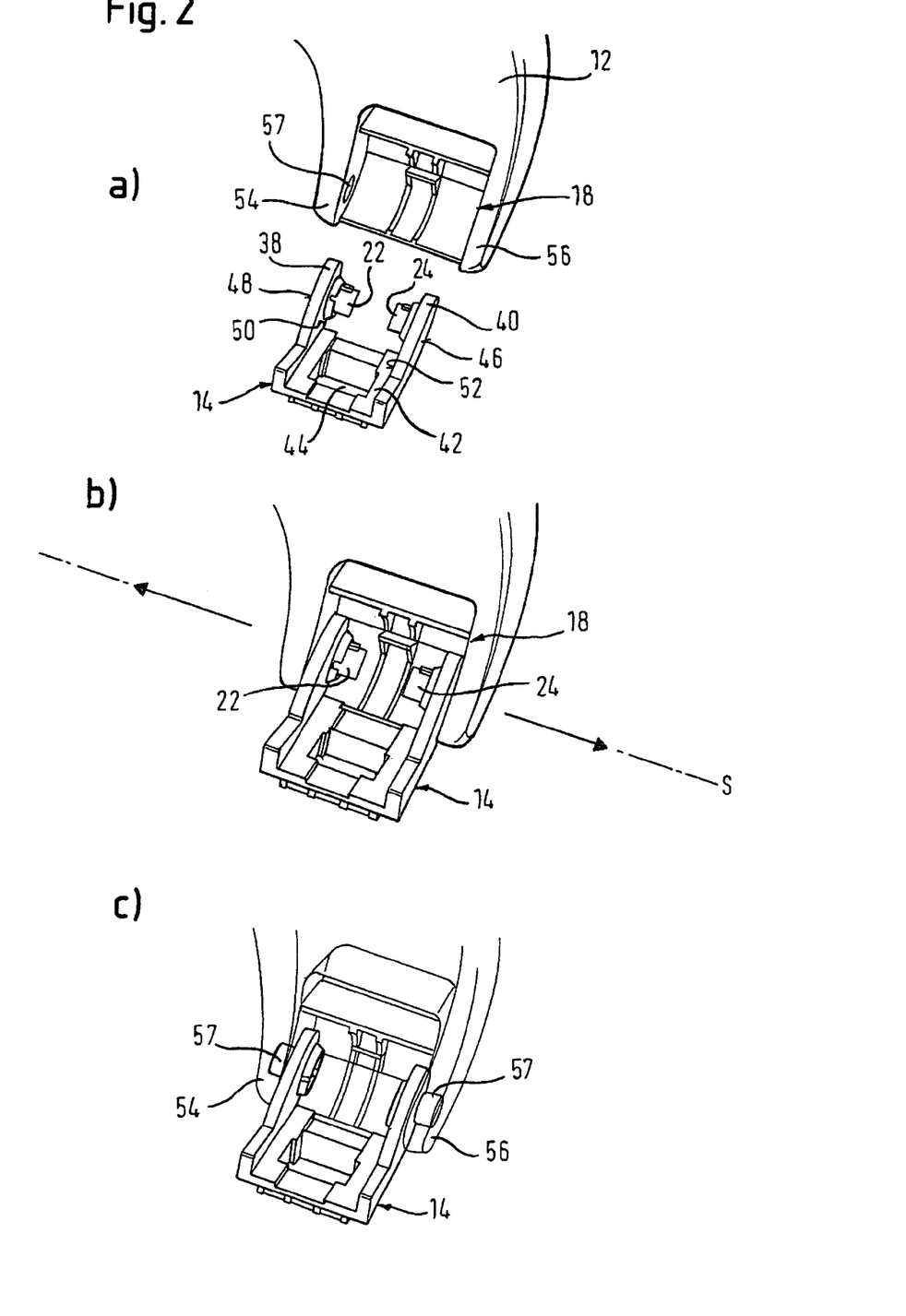
FIGS. 2a-c show perspective detailed views of the fitting of the bearing support on the handle of the vehicle grab hands according to the invention.

FIG. 2a shows the bearing section 18 of the handle 12 and the bearing support 14. The bearing support 14 is substantially in the shape of a U, with side pieces 38, 40 located opposite one another which are connected as one part by a bearing support base 42, the bearing support base 42 having a mounting opening 44. Provided on the bearing support 14 are the two shaft stubs 22, 24 which define the pivot axis S for the handle 12. More precisely, the shaft stubs 22, 24 are each held in an opening of the side pieces 38, 40 of the bearing support 14. With the bearing support 14, the shaft stubs 22, 24 form a pre-fitted unit and are secured against release on the bearing support 14. In this case, clamping projections on the circumferential edge of the openings of the side pieces 38, 40 press radially against the shaft stubs 22, 24, and thus secure the latter against release and position them in the inwardly shifted initial position. After overcoming the force of the clamping projections, the shaft stubs 22, 24 can still be shifted along the pivot axis S.

In FIG. 2a, the shaft stubs 22, 24 are in the initial position, in which the shaft stubs 22, 24 are flush with a respective outer surface 46, 48 of the side pieces 38, 40 and respectively project over an inner surface 50, 52 of the side pieces 38, 40 of the U-shaped bearing support 14. In this initial position of the shaft stubs 22, 24, the bearing support 14 is movable between two bearing lugs 54, 56 of the handle 12, recesses 57 being formed in the bearing lugs.

In FIG. 2b, the bearing support 14 is aligned such that the shaft stubs 22, 24 and the recesses 57 of the bearing lugs 54, 56 lie on the pivot axis S. The shaft stubs 22, 24 are each pushed outwards in the direction of the arrows until they are flush with the respective inner surface 50, 52 of the side pieces 38, 40. The shaft stubs 22, 24 engage here in the recesses 57 of the bearing lugs 54, 56 so that in the connection position (FIG. 2c) the handle 12 is coupled with the bearing support 14. The recesses 57 here have a circumferential wall for guiding the shaft stubs 22, 24 and a base for limiting the axial displacement of the shaft stubs 22, 24. In FIG. 2c, the handle 12 is shown transparently so that the recesses 57 are clearly visible. Due to production tolerances, there is a certain amount of play between the shaft stubs 22, 24 and the circumferential wall of the recesses 57. In this case the play is desirable so as to guarantee problem-free fitting of the vehicle grab handle 10 to the vehicle body 16. The design of the base makes it possible to limit the axial displacement of the shaft stubs 22, 24 so that no displacement of the shaft stubs 22, 24 can happen from the initial position to beyond the connection position. Preferably, the base of the recess 57 is closed so that no openings for the shaft stubs 22, 24 can be seen from the outside, and so that there is no negative visual impact.

Figure 3:
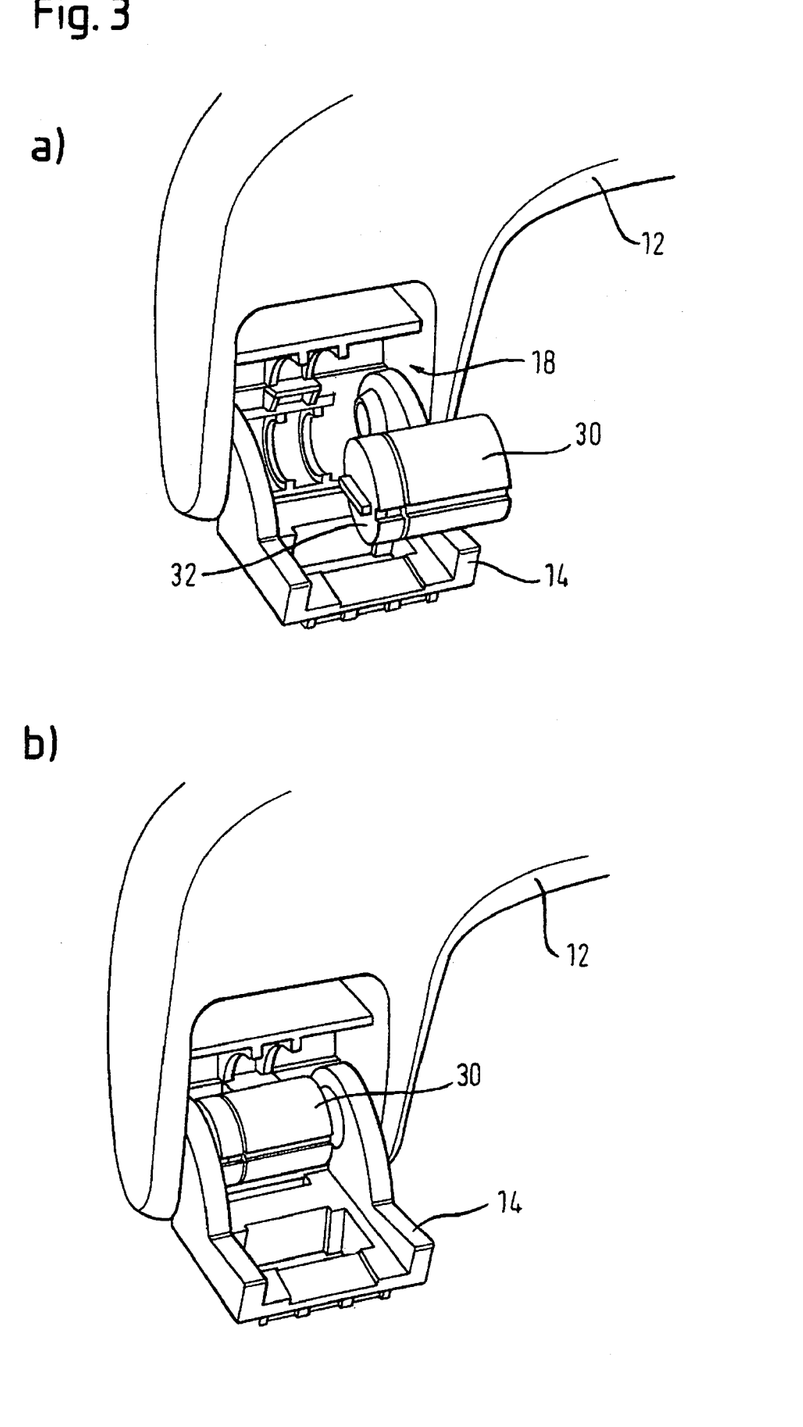
FIGS. 3a and 3b show perspective detailed views of the fitting of the spring housing in the vehicle grab handle according to the invention.

As can be seen in FIG. 3a, in the following the installation element is introduced between the two shaft stubs 22, 24 of the bearing support 14, and this installation element locks the shaft stubs 22, 24 in the connection position (FIG. 3b).

In FIGS. 3a and b, the installation element is the spring housing 30, 32. The spring housing 30, 32 is designed such that, in its attachment position according to FIG. 3b, it is fixed in its position, e.g. it is locked in the bearing support 14, and takes on the return function of the vehicle grab handle 10. The shaft stubs 22, 24 are thus on the one hand fixed by the base of the recesses 57 in the handle 12, and on the other hand, fixed in the axial direction by the spring housing 30, 32.

Figure 4:
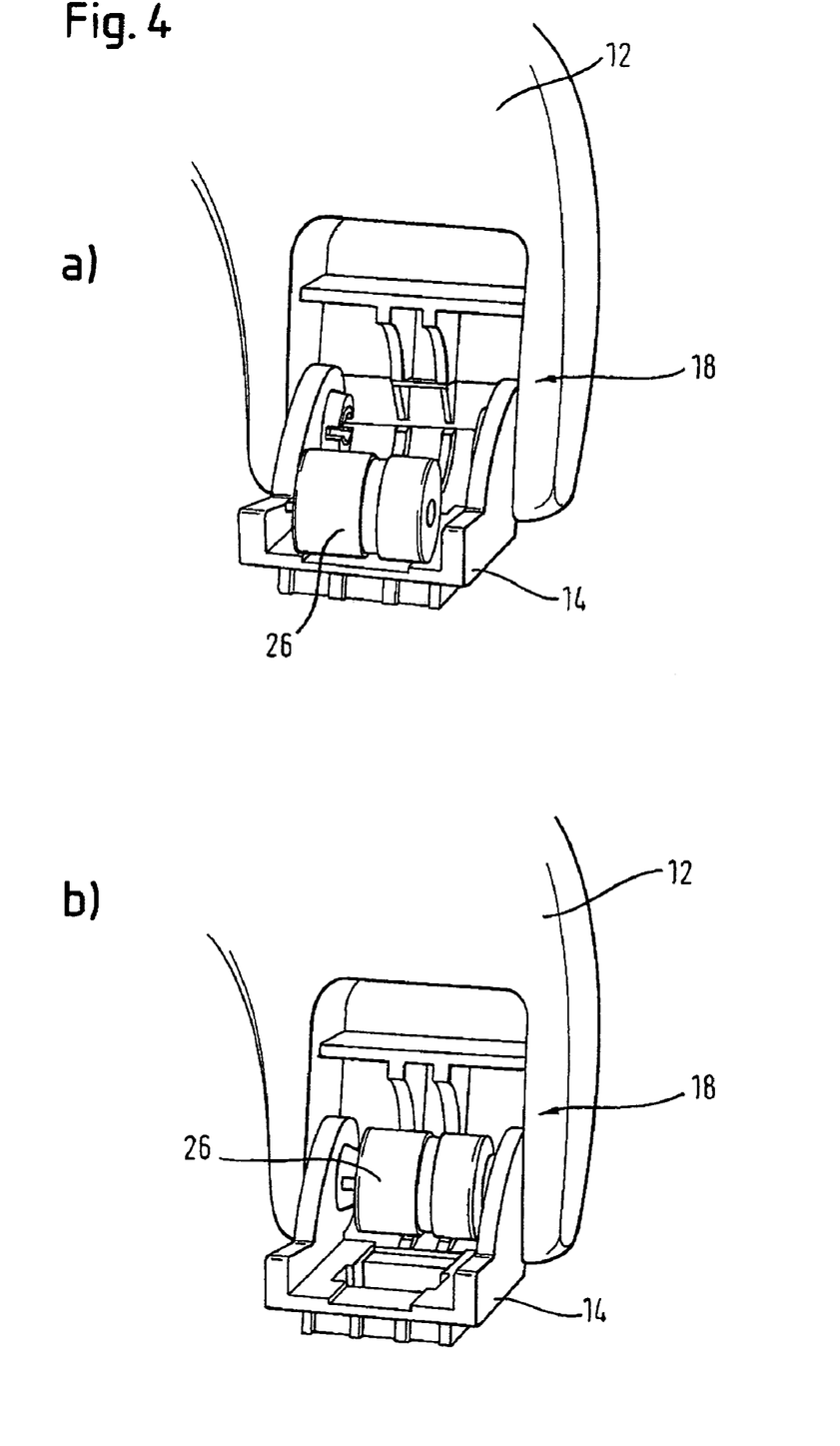
FIGS. 4a and 4b show perspective detailed views of the fitting of the damper in the vehicle grab handle according to the invention.

FIGS. 4a and b show the attachment of the damper 26, which happens similarly to the attachment of the spring housing 30, 32 according to FIGS. 3a and b.

FIGS. 5a and b reproduce the fitting of the metal bracket 34. The U-shaped metal bracket 34 has two side walls 58, 60 located opposite one another which are connected to one another by means of a web 62. On the side opposite the web 62, the side walls 58, 60 of the metal bracket 34 are angled outwardly such that two tabs 64, 66 are formed. The tabs 64, 66 are substantially parallel to the web 62 and point away from one another. Furthermore, the side walls 58, 60 each have a punched out locking tongue 68 and a detent 70 at the upper end of the locking tongue 68 which are described in more detail below. The region of the metal bracket 34 in which locking elements such as the locking tongue 68 or the detent 70 are disposed is also generally called the locking section of the metal bracket 34. The preferred material for forming the metal bracket 34 is spring sheet metal.

In FIG. 5b, the metal bracket 34 is introduced into the fitting opening 44 of the bearing support 14 and held securely in position so that the metal bracket 34 and the bearing support 14 are positioned correctly relative to one another for the further fitting. In this pre-fitted position, the tabs 64, 66 of the metal bracket 34 lie on the edges of the fitting opening 44, i.e. on the bearing support base 42. Preferably, the locking tongues 68 of the metal bracket 34 are designed such that they pre-lock the metal bracket 34 in the bearing support 14 and secure it in its position.

Figure 6:
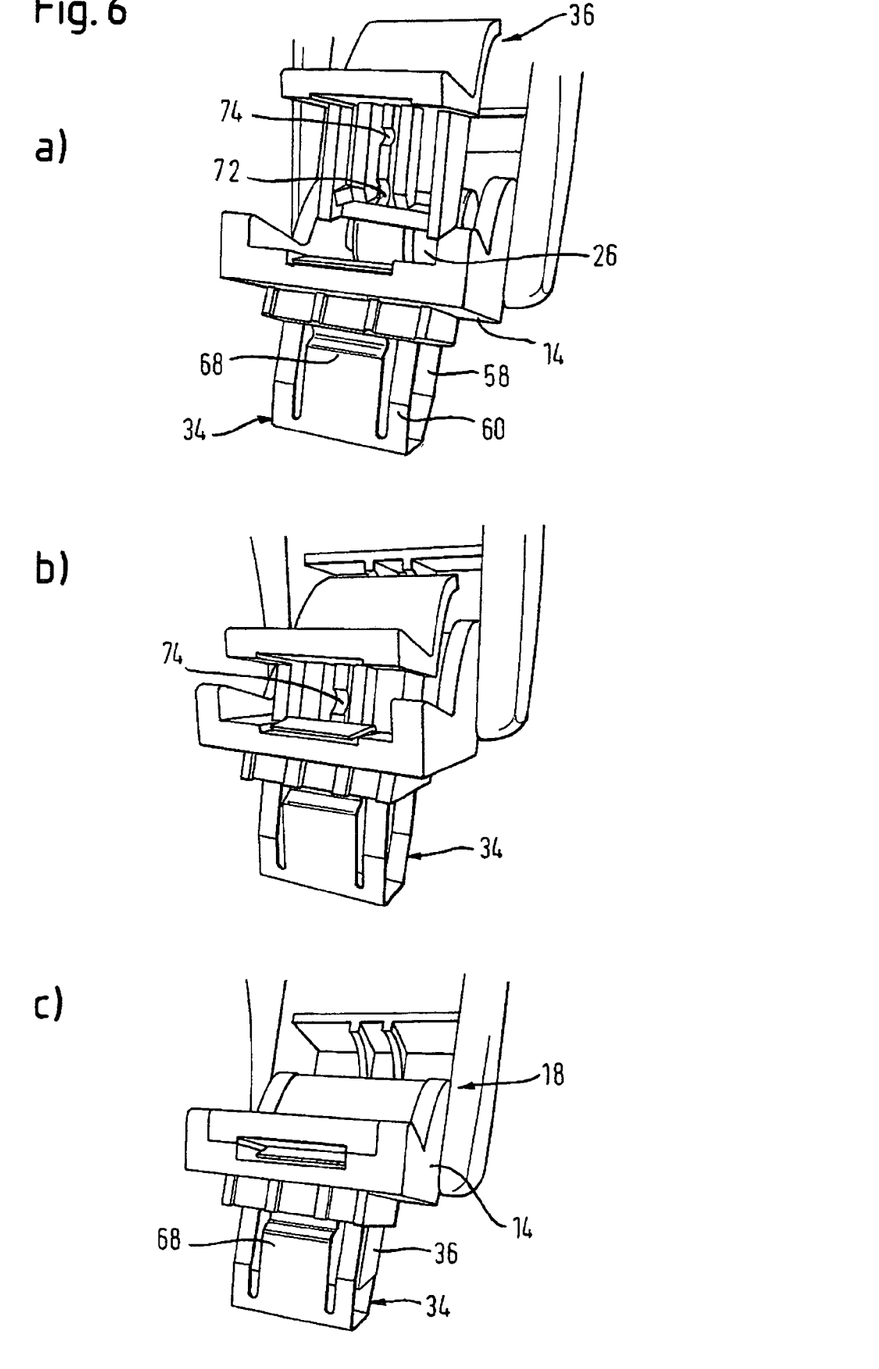
FIGS. 6a-c show perspective detailed views of the fitting of the securing element for the vehicle grab handle according to the invention.

In a further assembling step according to FIGS. 6a-c, the securing element 36 is fitted. The securing element 36 has a first indent 72 and a second indent 74, and is also introduced into the fitting opening 44 of the bearing support 14. The securing element 36 here is pushed between the side walls 58, 60 of the metal bracket 34.

Figure 5:
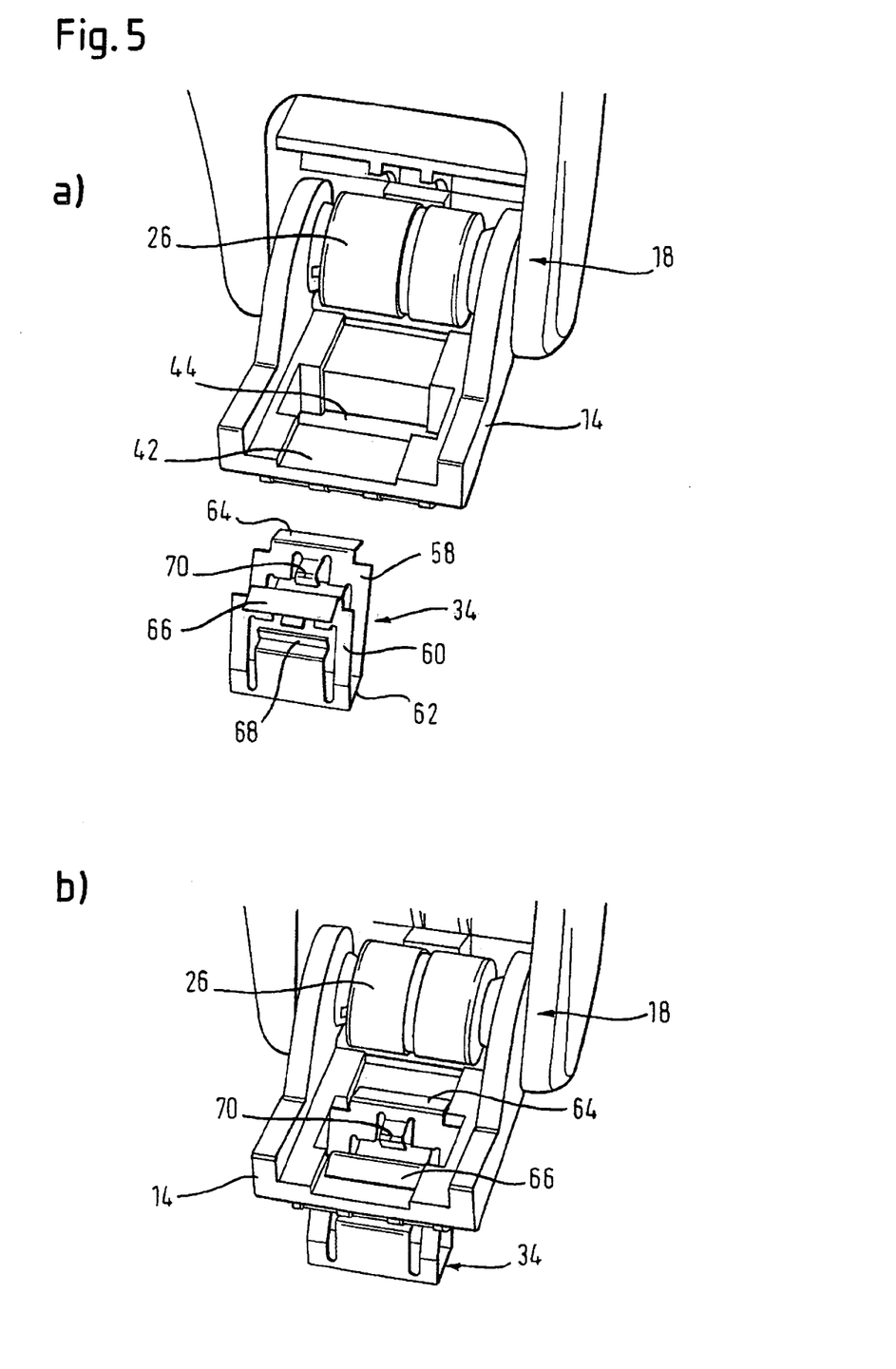
FIGS. 5a and 5b show perspective detailed views of the fitting of the metal bracket in the bearing support of the vehicle grab handle according to the invention.

In a pre-assembled position (FIG. 6b), the metal bracket 34 and the securing element 36 form a form-fitted connection, by means of which the securing element 36 is fixed relative to the metal bracket 34. In this embodiment, the detents 70 (see FIG. 5) of the side walls 58, 60 of the metal bracket 34 catch in the first indent 72 of the securing element 36 so as to form this form-fitted connection. Thus, a pre-assembled state of the whole vehicle grab handle is produced according to FIG. 6b which also corresponds to a delivery state of the vehicle grab handle 10.

After this, the bearing support 14 or the two bearing supports 14 of the vehicle grab handle 10 according to FIG. 1 are pressed into appropriate fitting openings of the vehicle body 16, by means of which the locking tongues 68 move inwards, i.e. towards one another, until they snap outwards again and are locked in the vehicle body 16. So as to prevent the locking connection between the metal bracket 34 and the vehicle body 16 from being released if the vehicle grab handle 10 is subjected to strong force, the locking tongues 68 of the side walls 58, 60 of the metal bracket 34 are locked in their locked position by the securing element 36 made from synthetic. For this purpose, the securing element 36 is pressed further towards the web 62 of the metal bracket 34 until the metal bracket 34 forms a further form-fitted connection with the securing element 36, by means of which the securing element 36 is fixed in a locking position relative to the metal bracket 34 (FIG. 6c). In order to form this form-fitted connection, the detent 70 of the metal bracket 34 catches in the second indent 74 of the securing element 36. The locking tongues 68 of the metal bracket 34 for attaching the vehicle grab handle 10 to the vehicle body 16 are pressed outwards by the securing element 36 into the locked position, and held there. Any movement of the locking tongues 68 towards one another is prevented by the securing element 36.

The connection between the vehicle grab handle 10 and the vehicle body 16 is thus able to withstand high levels of force and, due to the use of a metal bracket, is also very durable. When a synthetic is used for clipping the handles, the quality of the connection decreases over time due to the relaxation characteristics of synthetic.

FIG. 7 shows the complete vehicle grab handle 10 fully fitted on the vehicle body 16 which is only shown schematically on the left bearing support 14.

The invention claimed is:

1. A vehicle grab handle (10) comprising a handle (12) and at least one bearing support (14) for attaching the vehicle grab handle (10) to a vehicle body (16), a bearing section (18) of the handle (12) being pivotally mounted to the bearing support (14), wherein two shaft stubs (22, 24) are provided on the bearing support (14) which define a pivot axis (S) for the handle (12) and which can be shifted relative to the bearing support (14) along the pivot axis (S) from an initial position to a connection position, the shaft stubs (22, 24) coupling the handle (12) and the bearing support (14) to one another in the connection position.

2. The vehicle grab handle (10) according to claim 1, wherein the initial position of the shaft stubs (22, 24), the bearing support (14) is movable between two bearing lugs (54, 56) of the handle (12).

3. The vehicle grab handle (10) according to claim 1, wherein the initial position, the shaft stubs (22, 24) form a pre-fitted unit with the bearing support (14) and are secured against release on the bearing support (14).

4. The vehicle grab handle (10) according to claim 1, wherein the bearing section (18) of the handle (12) has recesses in which the shaft stubs (22, 24) engage in the connection position.

5. The vehicle grab handle (10) according to claim 4, wherein the recesses have a circumferential wall for guiding the shaft stubs (22, 24) and a base for limiting the axial displacement of the shaft stubs (22, 24).

6. The vehicle grab handle (10) according to claim 4, wherein the bearing support (14) has an installation element located between the two shaft stubs (22, 24) which locks the shaft stubs (22, 24) in the connection position.

7. The vehicle grab handle (10) according to claim 6, wherein the installation element is one of a spring housing (30, 32) and a damper (26).

8. The vehicle grab handle (10) according to claim 1, wherein two bearing supports (14), each comprising an installation element, are provided for attaching the vehicle grab handle (10), the installation elements having identical external dimensions.

9. The vehicle grab handle according to claim 1, wherein the bearing support (14) and the shaft stubs (22, 24) are produced as a 2-component injection moulded unit.

* * * * *